(12) United States Patent
Shin et al.

(10) Patent No.: US 11,855,476 B2
(45) Date of Patent: Dec. 26, 2023

(54) CHARGER AND CONTROL METHOD THEREOF

(71) Applicant: LG ELECTRONICS INC., Seoul (KR)

(72) Inventors: Hyunkeun Shin, Seoul (KR); Seonghoon Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 17/111,010

(22) Filed: Dec. 3, 2020

(65) Prior Publication Data

US 2021/0194267 A1 Jun. 24, 2021

(30) Foreign Application Priority Data

Dec. 20, 2019 (KR) .......................... 10-2019-0172210

(51) Int. Cl.
*H02J 7/00* (2006.01)
*H01M 10/44* (2006.01)

(52) U.S. Cl.
CPC ..... *H02J 7/007194* (2020.01); *H01M 10/443* (2013.01); *H02J 7/0047* (2013.01); *H02J 7/00711* (2020.01)

(58) Field of Classification Search
CPC ............. H02J 7/007194; H02J 7/00711; H02J 7/0047; H01M 10/443
USPC .......................................... 320/141, 150–154
See application file for complete search history.

(56) References Cited

U.S. PATENT DOCUMENTS

| 5,629,600 | A | | 5/1997 | Hara | |
|---|---|---|---|---|---|
| 5,694,023 | A | * | 12/1997 | Podrazhansky | ...... H02J 7/00711 320/132 |
| 5,965,996 | A | * | 10/1999 | Arledge | ................. B60L 58/22 320/116 |
| 6,124,698 | A | * | 9/2000 | Sakakibara | ......... H02J 7/00302 320/160 |

(Continued)

FOREIGN PATENT DOCUMENTS

| JP | 07-039080 | 2/1995 |
|---|---|---|
| JP | 2004-274962 | 9/2004 |

(Continued)

OTHER PUBLICATIONS

International Search Report dated Mar. 2, 2021 issued in International Application No. PCT/KR2020/015961.

*Primary Examiner* — Alexis B Pacheco
(74) *Attorney, Agent, or Firm* — KED & ASSOCIATES, LLP

(57) ABSTRACT

A charger and a control method are disclosed. A charger according to an embodiment of the present disclosure includes a transceiver configured to obtain, from a battery of a cleaner, temperature information of the battery, and a processor configured to apply power to the battery based on the temperature information transmitted from the transceiver, wherein the processor applies a pulse wave of a first period to the battery when the temperature of the battery is measured within a predetermined first section. Accordingly, even if the temperature of the battery is outside the charge allowance range due to the discharge of the battery built in the cleaner, the battery can be charged more quickly, thereby reducing the total time required for charging the battery.

14 Claims, 20 Drawing Sheets

(56) References Cited

U.S. PATENT DOCUMENTS

| | | | | |
|---|---|---|---|---|
| 2002/0070710 A1* | 6/2002 | Yagi | ................. | H02J 7/007194 |
| | | | | 320/150 |
| 2005/0017681 A1* | 1/2005 | Ogishima | ............. | A47L 9/2805 |
| | | | | 320/112 |
| 2010/0164437 A1* | 7/2010 | Mckinley | ............ | H01M 10/049 |
| | | | | 320/152 |
| 2012/0176082 A1* | 7/2012 | Lee | ................. | H01M 10/4264 |
| | | | | 903/907 |
| 2018/0241098 A1* | 8/2018 | Kang | ................. | H01M 10/613 |

FOREIGN PATENT DOCUMENTS

| | | |
|---|---|---|
| KR | 10-2011-0088270 | 8/2011 |
| KR | 10-2013-0061951 | 6/2013 |
| KR | 10-2018-0045694 | 5/2018 |

\* cited by examiner

CHARGER AND CONTROL METHOD THEREOF

CROSS-REFERENCE TO RELATED APPLICATION

This application claims priority under 35 U.S.C. § 119 to Korean Application No. 10-2019-0172210 filed on Dec. 20, 2019, whose entire disclosure is hereby incorporated by reference.

BACKGROUND

1. Field

The present disclosure relates to a charger and a control method thereof, and more particularly, to a charger and a control method for intelligently charging a battery attached to a cleaner.

2. Background

In general, cleaners are home appliances that suck small garbage or dust in a manner of sucking air using electricity and fill it in dust bins in products, and are generally called vacuum cleaners. Such a cleaner may be classified into a manual cleaner for performing cleaning while the user directly moves the cleaner, and an automatic cleaner for performing cleaning while driving by itself. The manual cleaner may be classified into a canister vacuum cleaner, an upright vacuum cleaner, a hand vacuum cleaner, and a stick vacuum cleaner or the like depending on the type of the cleaner.

In the household cleaners, the canister vacuum cleaner was used a lot in the past, but recently, the hand vacuum cleaner and the stick vacuum cleaner, which improve the convenience of use by providing a dust box and a cleaner body integrally, have been used a lot. The canister vacuum cleaner has a main body and a suction port connected by a rubber hose or a pipe and, in some cases, can be used with a brush attached to the suction port.

The hand vacuum cleaner maximizes portability, and it is light in weight but short in length, so there may be limitations in sitting area for cleaning. Therefore, it is used to clean local places such as on a desk or sofa or in a car.

The stick vacuum cleaner can be used with standing and can be used without bowing. Therefore, it is advantageous for cleaning while moving in a large area. If the hand vacuum cleaner cleans a small area, the stick vacuum cleaner can clean a wider area and a high place out of reach. Recently, the stick vacuum cleaner is provided as a modular type, and it is also used to actively change the cleaner type for various objects. In addition, recently, the hand vacuum cleaner and the stick vacuum cleaner are provided to be used in combination, and products that improve user convenience have been released.

On the other hand, the hand/stick vacuum cleaner may have a detachable rechargeable battery. While not using the vacuum cleaner, the user may charge the battery built in the vacuum cleaner by placing the vacuum cleaner on a charger connected to a power outlet.

On the other hand, temperature of the battery greatly affects performance and safety of the battery. For this reason, the battery of the vacuum cleaner is marked with available temperature. In other words, if the battery is used above the allowable temperature marked on the battery, the user's safety may be threatened.

Further, discharge allowable temperature and charge allowable temperature are different in specifications for each battery. On the other hand, a discharge allowable temperature range is wider than a charge allowable temperature range. Here, when discharging to the maximum value of the discharge allowable temperature range of the battery, it will be outside the charge allowable temperature range. Accordingly, the user must wait for charging until the temperature of the battery drops to the charge allowable temperature range, and the time required for charging is unnecessarily increased.

BRIEF DESCRIPTION OF THE DRAWINGS

The embodiments will be described in detail with reference to the following drawings in which like reference numerals refer to like elements wherein.

DETAILED DESCRIPTION

Figure 1:
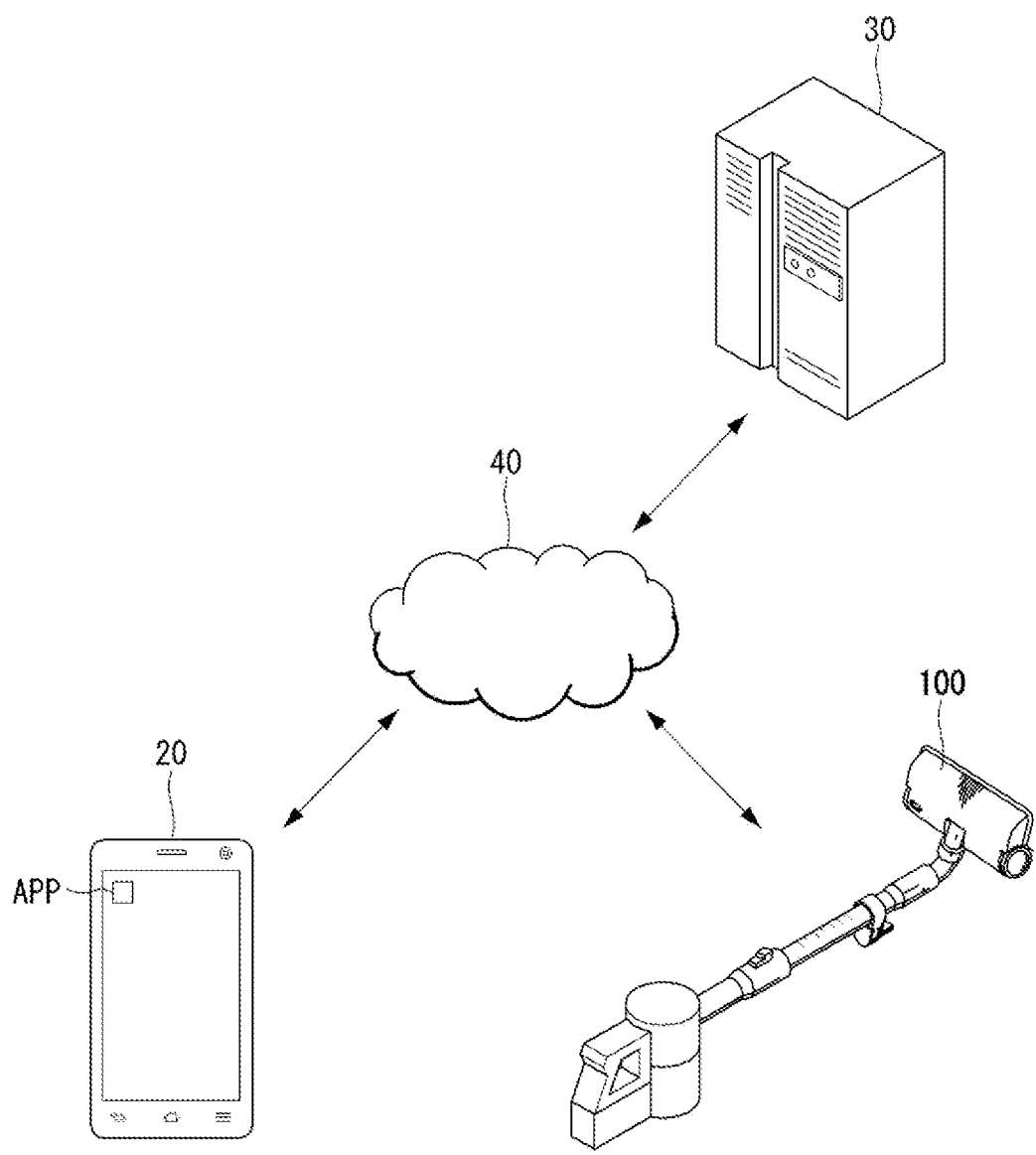
FIG. 1 is a view illustrating a configuration for control of a vacuum cleaner according to an embodiment of the present disclosure.

Hereinafter, with reference to the accompanying drawings will be described in detail an embodiment disclosed in the present disclosure, however, the same or similar components regardless of the reference numerals are given the same reference numerals and redundant description thereof will be omitted. In describing the embodiments disclosed in the present disclosure, when a component is referred to as being "coupled" or "connected" to another component, it may be directly coupled to or connected to the other component, however, it should be understood that other components may exist in the middle.

In addition, in describing the embodiments disclosed in the present disclosure, when it is determined that the detailed description of the related known technology may obscure the gist of the embodiments disclosed in the present disclosure, the detailed description thereof will be omitted. In addition, the accompanying drawings are only for easily understanding of the embodiments disclosed in the present disclosure, but the technical spirit disclosed in the present disclosure is not limited by the accompanying drawings, and it should be understood that the accompanying drawings include all changes, equivalents, and substitutes included in the spirit and scope of the present disclosure. On the other hand, the term "disclosure" may be replaced with terms such as document, specification, description.

Figure 2:
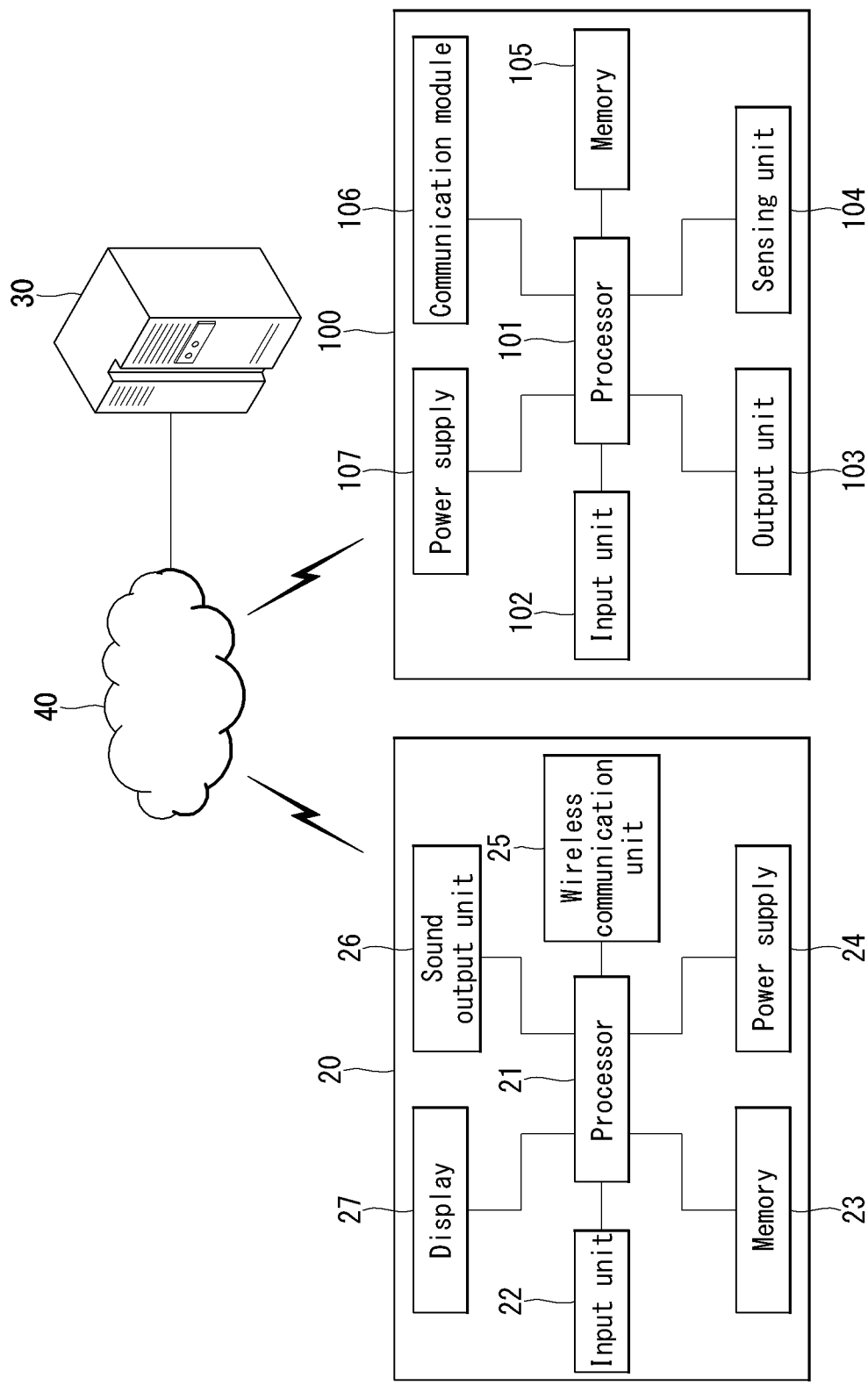
FIG. 2 is a control block diagram of each component constituting a control system of a vacuum cleaner and a smart device.

FIG. 1 is a view illustrating a configuration for control of a vacuum cleaner 100 according to an embodiment of the present disclosure, and FIG. 2 is a control block diagram of each component constituting a control system of a vacuum cleaner 100 and a smart device 20. Referring to FIG. 1, a control system of a vacuum cleaner 100 according to an embodiment of the present disclosure may include a vacuum cleaner 100, a smart device 20 equipped with an application (APP) for controlling or managing the vacuum cleaner 100, a server 30 for managing the application 30, and the internet 40 for communication among the smart device 20, the vacuum cleaner 100, and the server 30.

Referring to FIG. 2, the vacuum cleaner 100 may include a processor (or controller) 101, an input unit 102, an output unit 103, a sensing unit (or sensor) 104, a memory 105, a communication module 106, and a power supply 107. The processor 101 may include a controller. For example, it may include a micro controller unit (MCU).

The input unit 102 may be formed in a control panel provided near a handle of the vacuum cleaner 100, and may be provided in the form of a touch button or a push button. Alternatively, the input unit 102 may be provided in a microphone form to recognize a voice command. In addition, an input unit including a camera or an image sensor may be provided to recognize a gesture of a user.

The output unit 103 may include a display provided as an image output unit and a speaker provided as a sound output unit. The display may be provided in the control panel or provided as a separate display area, and may include an LCD panel on which an image or a video is output. Alternatively, the display may simply include a singular light emitting unit or a plurality of light emitting units. The speaker may output a selection sound, a warning sound, a cleaning start or cleaning completion notification signal, and the like. In addition, the speaker may be provided in an area other than the handle that can be grabbed by the user.

The sensing unit 104 may include a current sensor for detecting a current value (or voltage value) of a driver to be described later, a load sensor for detecting a load of the driver, a torque sensor for detecting a torque of the driver, and a timer for detecting an operation hour and time. The memory 105 may include DRAM (RAM that requires refreshing), SRAM (RAM that does not require refreshing), ROM, EPROM, EEPROM, and the like.

In addition, the communication module 106 may include a wired communication module including a power line communication (PLC) capable of the internet communication or a wireless communication module including Wi-Fi. The communication module 106 may include a transceiver or an antenna. The transceiver may include a transmitter and a receiver.

In addition, the vacuum cleaner 100 may further include a power supply 107 and the driver for operating the vacuum cleaner 100. The driver may include a driving motor or a motor pump. The driving motor may include a main driving motor that is installed in a cleaner body to generate a suction force and an auxiliary driving motor that is installed in a suction nozzle provided at a suction end of the vacuum cleaner to generate a rotational force of a roller and the like.

On the other hand, the smart device 20 may include, for example, a smart phone that the user can carry or other computing device. The smart device 20 may include a processor 21, an input unit 22, a memory 23, a power supply 24, a wireless communication unit 25, a sound output unit 26, and a display 27. The input unit 22 may include a touch type button for inputting a command by touching the display 27. In addition, the wireless communication unit 25 may be a wireless communication module capable of communicating with the internet 40. In addition, the sound output unit 26 may include a speaker.

According to the above configuration, the user may execute the application (APP) for managing or controlling the vacuum cleaner 100 installed in the smart device 20, and may check a management state of the vacuum cleaner 100 or input a control command through this application. In addition, the user may receive information related to the management state of the vacuum cleaner 100 stored in the server 30 through the internet 40 to the smart device 20. The control command input to the smart device 20 is transmitted to the server 30 of the application through the internet 40, and the server 30 may transmit a control command to the communication module 106 of the vacuum cleaner 100 through the internet 40.

In addition, the control command received through the communication module 106 is received to the processor 101 of the vacuum cleaner 100, and the processor 101 may control the operation of the driver according to the received control command. In addition, the processor 101 of the vacuum cleaner 100 may transmit an event occurring in the cleaning process and being received from the sensing unit 104 via wire or wireless through the communication module 106. The event information transmitted through the communication module 106 of the vacuum cleaner 100 may be transmitted to the server 30 through the internet 40. In addition, the server 30 may transmit the received event information to the wireless communication unit 25 of the smart device 20 through the internet 40. In addition, the event information received by the wireless communication unit 25 may be displayed on the display 27 by the processor 21 of the smart device 20.

Figure 3:
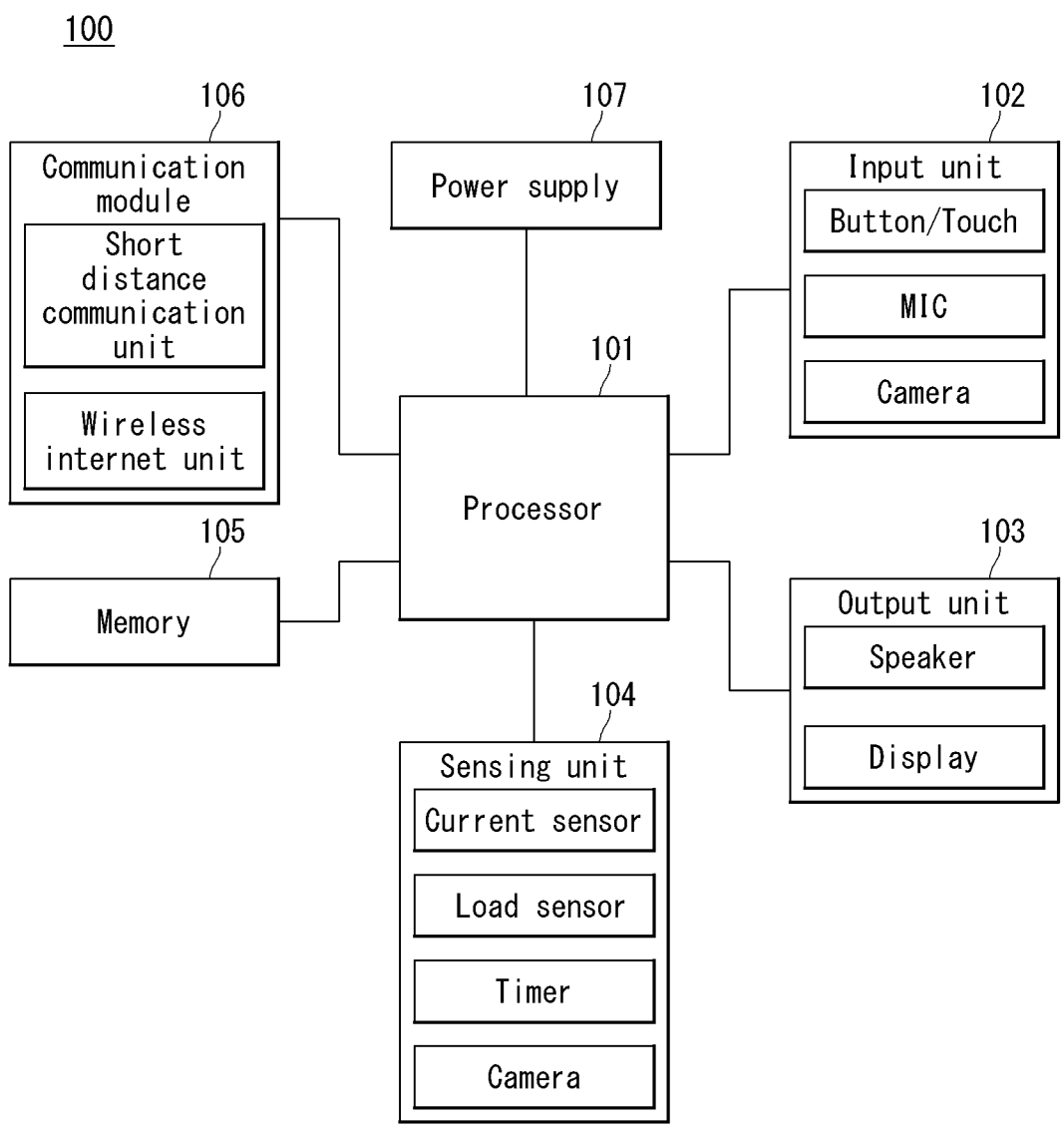
FIG. 3 illustrates a customized cleaning information providing apparatus according to an embodiment of the present disclosure.

FIG. 3 illustrates a customized cleaning information providing apparatus (or vacuum cleaner) 100 according to an embodiment of the present disclosure. Referring to FIG. 3, the customized cleaning information providing apparatus 100 may include a processor 101, an input unit 102, an output unit 103, a sensing unit 104, a memory 105, a communication module 106, and/or a power supply 107.

The processor 101 may include a controller. For example, it may include a micro controller unit (MCU). The input unit 102 may include a physical button or a touch button that receives a physical signal or a touch signal from outside and a microphone that receives an audio signal based on the control of the processor 101. In addition, the input unit 102 may include a camera or an image sensor that receives an image from outside based on the control of the processor 101.

The output unit 103 may include a speaker that outputs an audio signal based on the control of the processor 101. For example, the speaker may provide the customized cleaning information in a form of the audio signal. The output unit 103 may include a display for outputting visual information based on the control of the processor 101. The display may implement a touch screen by forming a layer structure or integrally with the touch sensor. The touch screen may function as a user input unit that provides an input interface between the customized cleaning information providing apparatus 100 and the user, at the same time, and may provide an output interface between the customized cleaning information providing apparatus 100 and the user. For example, the display may obtain information for user registration from the user. In addition, the display may output the customized cleaning information to the user in the form of visual information. That is, the display may be the input interface of the customized cleaning information providing apparatus 100 and, at the same time, may be the output interface of the customized cleaning information providing apparatus 100.

The sensing unit 104 may include sensors for sensing information of any one or more of a current, a voltage, a load, and a torque of the driver of the customized cleaning information providing apparatus 100. In addition, the sensing unit 104 may include a timer capable of knowing an operating hour and an operating time of the driver. In addition, the sensing unit 104 may include a camera or an image sensor to detect the user or an obstacle.

The memory 105 stores data that supports various functions of the customized cleaning information providing apparatus 100. The memory 105 may store a plurality of application programs or applications driven in the customized cleaning information providing apparatus 100, data and instructions for operating the customized cleaning information providing apparatus 100. At least some of these applications may be downloaded from an external server through wireless communication. In addition, at least some of these application programs may exist on the customized cleaning information providing apparatus 100 from the time of shipment for basic functions (e.g. functions of receiving and transmitting data) of the customized cleaning information providing apparatus 100. On the other hand, the application program may be stored in the memory 105, installed on the customized cleaning information providing apparatus 100, so that the application program may be driven by the processor 101 to perform an operation (or function) of the customized cleaning information providing apparatus 100.

The communication module 106 may include one or more modules that enable wireless communication between the customized cleaning information providing apparatus 100 and the wireless communication system, between the customized cleaning information providing apparatus 100 and other customized cleaning information providing apparatus, or between the customized cleaning information providing apparatus 100 and the external server. In addition, the communication module 106 may include one or more modules for connecting the customized cleaning information providing apparatus 100 to one or more networks. Here, the communication module 106 may be connected to the 5G communication system. The communication module 106 may perform wireless communication with other customized cleaning information providing apparatus, an external server or an external apparatus (e.g. a mobile terminal) through the 5G communication system. The communication module 106 may include at least one of a short range communication unit and a wireless internet unit.

The wireless internet unit refers to a module for wireless internet access, and may be built in or external to the customized cleaning information providing apparatus 100. The wireless internet unit is configured to transmit and receive wireless signals in a communication network based on wireless internet technologies.

The wireless internet technologies include, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc., and the wireless internet unit transmits and receives data based on at least one wireless internet technology in a range including internet technologies not listed above.

If the wireless internet access by WiBro, HSDPA, HSUPA, GSM, CDMA, WCDMA, LTE, LTE-A, etc. is made through a mobile communication network, the wireless internet unit for performing wireless internet access through the mobile communication network may be understood as a kind of the mobile communication module.

The short range communication unit is for short range communication, and the short range communication unit may support the short range communication using at least one of Bluetooth, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technology. Such a short range communication unit may support wireless communication between the customized cleaning information providing apparatus 100 and the wireless communication system, between the customized cleaning information providing apparatus 100 and other customized cleaning information providing apparatus, or between the customized cleaning information providing apparatus 100 and a network in which another mobile terminal (or an external server) is located through wireless area networks. The short range wireless communication networks may be short range wireless personal area networks.

Here, the other customized cleaning information providing apparatus may be an apparatus capable of exchanging (or interlocking) data with the customized cleaning information providing apparatus 100 according to the present disclosure. The short range communication unit, around the customized cleaning information providing apparatus 100, may detect (or recognize) other customized cleaning information providing apparatus that can communicate with the customized cleaning information providing apparatus 100. Furthermore, when the detected other customized cleaning information providing apparatus is a customized cleaning information providing apparatus certified to communicate with the customized cleaning information providing apparatus 100 according to the present disclosure, the processor 101 may transmit at least a part of data processed by the customized cleaning information providing apparatus 100 to the other customized cleaning information providing apparatus through the short range communication unit. Therefore, the user of the other customized cleaning information providing apparatus may use data processed by the customized cleaning information providing apparatus 100 through the other customized cleaning information providing apparatus. For example, according to this, the user can receive cleaning information from the customized cleaning information providing apparatus 100, and output the cleaning information through a display of the other customized cleaning information providing apparatus 100.

The power supply 107 receives power from an external power source and an internal power source under the control of the processor 101 to supply power to each component included in the customized cleaning information providing apparatus 100. The power supply 107 includes a battery, which may be a built-in battery or a replaceable battery.

According to an embodiment of the present disclosure, the processor 101 may control the input unit 102, the output unit 103, the sensing unit 104, the memory 105, the communication module 106, and the power supply 107. According to an embodiment of the present disclosure, the processor 101 may control the input unit 102 and the output unit 103 to provide customized cleaning information.

According to an embodiment of the present disclosure, the processor 101 may control the sensing unit 104 to obtain information necessary for the customized cleaning information providing apparatus 100. For example, the processor 101 may obtain current/voltage values, load values, torque values, operating hour and operating time information, user recognition information, and/or obstacle detection information from the sensing unit 104.

According to an embodiment of the present disclosure, the processor 101 may obtain a plurality of user's face images stored in the memory 105, and may generate/learn a face classification model for classifying a user's face by using (meta learning) only a predetermined number of images among the plurality of user's face images. In addition, the processor 101 may obtain images of a plurality of food items stored in the memory 105, and may generate/learn a food classification model for classifying food using only a predetermined number of images among the plurality of food images.

According to an embodiment of the present disclosure, the processor 101 may control the communication module 106 to transmit the customized cleaning information to an external mobile terminal. Detailed description of the function/operation of the processor 101 will be described in detail later.

Figure 4:
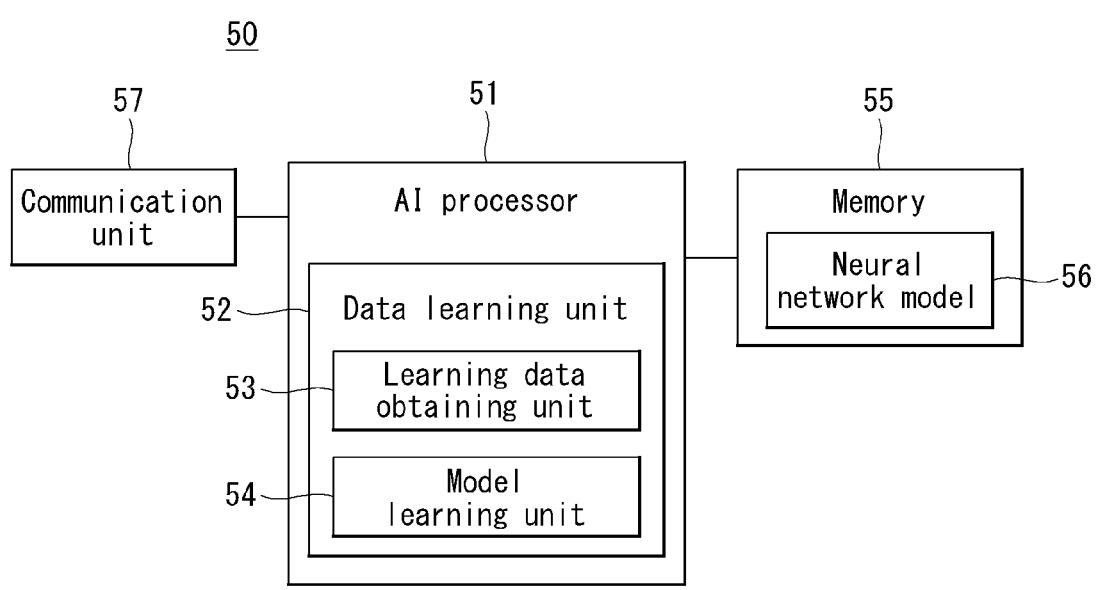
FIG. 4 is a black diagram illustrating an example of a processor of FIG. 3.

FIG. 4 is a black diagram illustrating an example of a processor 101 of FIG. 3. As shown in FIG. 4, a processor of FIG. 4 may be an AI device 50, but is not necessarily limited thereto. The AI device 50 may include an electronic device including an AI module capable of performing AI processing or a server including the AI module. In addition, the AI device 50 may be included in at least a part of the customized cleaning information providing apparatus 100 illustrated in FIG. 3 and may be provided to perform at least some of the AI processing together.

The AI processing may include all operations related to the control of the customized cleaning information providing apparatus 100 shown in FIG. 3. For example, the customized cleaning information providing apparatus 100 may perform processing/determination and control signal generation by performing the AI processing of the sensing data or the obtained data. In addition, for example, the customized cleaning information providing apparatus 100 may control an intelligent electronic device by performing the AI processing of the data received through the communication unit.

The AI device 50 may be a client device that directly uses an AI processing result, or a device of a cloud environment that provides the AI processing result to another device. The AI device 50 may include an AI processor 51, a memory 55, and/or a communication unit 57. The AI device 50 is a computing device capable of learning neural networks, and may be implemented as various electronic devices such as a server, a desktop PC, a notebook PC, a tablet PC, and the like.

The AI processor 51 may learn a neural network using a program stored in the memory 55. In particular, the AI processor 51 may learn a neural network for recognizing vehicle-related data. Here, the neural network for recognizing vehicle-related data may be designed to simulate a human brain structure on a computer, and may include a plurality of network nodes having weights, which simulate the neurons of a human neural network. A plurality of network modes may transmit and receive data according to each connection relationship so that neurons simulate the synaptic activity of neurons that transmit and receive signals through synapses. Here, the neural network may include a deep learning model developed from the neural network model. In the deep learning model, the plurality of network nodes may be located at different layers and transmit and receive data according to a convolutional connection relationship. Examples of the neural network models may include various deep learning techniques, such as deep neural networks (DNNs), convolutional deep neural networks (CNNs), recurrent boltzmann machines (RNNs), restricted boltzmann machines (RBMs), and deep belief networks (DBN), and Deep Q-Network, and may be applied to fields such as computer vision, speech recognition, natural language processing, speech/signal processing, and the like. On the other hand, the processor that performs the function described above may be a general purpose processor (e.g. CPU), but may be an AI dedicated processor (e.g. GPU) for artificial intelligence learning.

The memory 55 may store various programs and data necessary for the operation of the AI device 50. The memory 55 may be implemented as a nonvolatile memory, a volatile memory, a flash-memory, a hard disk drive (HDD), or a solid state drive (SDD), etc. The memory 55 may be accessed by the AI processor 51, and may read/write/modify/delete/update the data by the AI processor 51. In addition, the memory 55 may store a neural network model (e.g. deep learning model 56) generated through a learning algorithm for data classifying/recognizing according to an embodiment of the present disclosure.

On the other hand, the AI processor 51 may include a data learning unit 52 for learning the neural network for the data classification/recognition. The data learning unit 52 may learn a criterion about what learning data to use to determine the data classification/recognition and how to classify and recognize the data using the learning data. The data learning unit 52 may learn the deep learning model by obtaining the learning data to be used for learning and applying the obtained learning data to the deep learning model.

The data learning unit (or data learning processor) 52 may be manufactured in a form of at least one hardware chip and mounted on the AI device 50. For example, the data learning unit 52 may be manufactured in a form of a dedicated hardware chip for artificial intelligence (AI), or may be manufactured as a part of a general purpose processor (CPU) or a graphics dedicated processor (GPU) and mounted on the AI device 50. In addition, the data learning unit 52 may be implemented as a software module. When implemented as a software module (or a program module including instructions), the software module may be stored in a computer readable non-transitory computer readable recording media. In this case, at least one software module may be provided by an operating system (OS) or by an application.

The data learning unit 52 may include or may be coupled to a learning data obtaining unit (or data obtaining processor) 53 and a model learning unit (or model learning processor) 54. The learning data obtaining unit 53 may obtain learning data useful for a neural network model for classifying and recognizing data. For example, the learning data obtaining unit 53 may obtain vehicle data and/or sample data for input to the neural network model as the learning data.

The model learning unit 54 may learn to have a criterion about how the neural network model classifies predetermined data using the obtained learning data. In this case, the model learning unit 54 may learn the neural network model through supervised learning that uses at least some of the learning data as a criterion. Alternatively, the model learning unit 54 may learn the neural network model through unsupervised learning that finds a criterion by self-learning using the learning data without guidance. In addition, the model learning unit 54 may learn the neural network model through reinforcement learning using feedback on whether the result of the situation determination according to the learning is correct. In addition, the model learning unit 54 may learn the neural network model using learning algorithms that include error back-propagation or gradient decent.

When the neural network model is learned, the model learning unit 54 may store the neural network model in the memory. The model learning unit 54 may store the learned neural network model in the memory of the server connected to the AI device 50 through a wired or wireless network.

The data learning unit 52 may further include a learning data preprocessor (not shown) and a learning data selector (not shown) in order to improve analysis results of a recognition model, or to save resources or time required for generating the recognition model. The learning data preprocessor may preprocess the obtained data so that the obtained data may be used for learning for situation determination. For example, the learning data preprocessor may process the obtained data in a preset format so that the model learning unit 54 may use the obtained learning data for learning for image recognition.

In addition, the learning data selector may select data necessary for learning among the learning data obtained by the learning data obtaining unit 53 or the learning data preprocessed by the preprocessor. The selected learning data may be provided to the model learning unit 54. For example, the learning data selector may select only data for an object included in a specific area as learning data by detecting a specific area of an image obtained through a camera of the intelligent electronic device.

In addition, the data learning unit 52 may further include a model evaluator (not shown) to improve analysis results of the neural network model. The model evaluator may input the evaluation data into the neural network model, and when the analysis result output from the evaluation data does not satisfy a predetermined criterion, may allow the model learning unit 54 to learn again. In this case, the evaluation data may be predefined data for evaluating the recognition model. For example, among the analysis results of the learned recognition model on the evaluation data, when the number or ratio of evaluation data that is not accurate in analysis results exceeds a preset threshold, the model evaluator may evaluate that a predetermined criterion is not satisfied.

The communication unit 57 may transmit the AI processing result by the AI processor 51 to an external electronic device. The external electronic device may include an autonomous vehicle, a robot, a drone, an AR device, a mobile device, a home appliance, and the like.

For example, when the external electronic device is the autonomous vehicle, the AI device 50 may be defined as another vehicle or 5G network that communicates with the autonomous module vehicle. On the other hand, the AI device 50 may be implemented by being functionally embedded in the autonomous module provided in the vehicle. In addition, the 5G network may include a server or a module that performs autonomous related control.

On the other hand, the AI device 50 illustrated in FIG. 4 has been described to functionally be divided into the AI processor 51, the memory 55, the communication unit 57, and the like, but it should be noted that the above-described components may be integrated into one module and may be referred to as AI modules.

Figure 5:
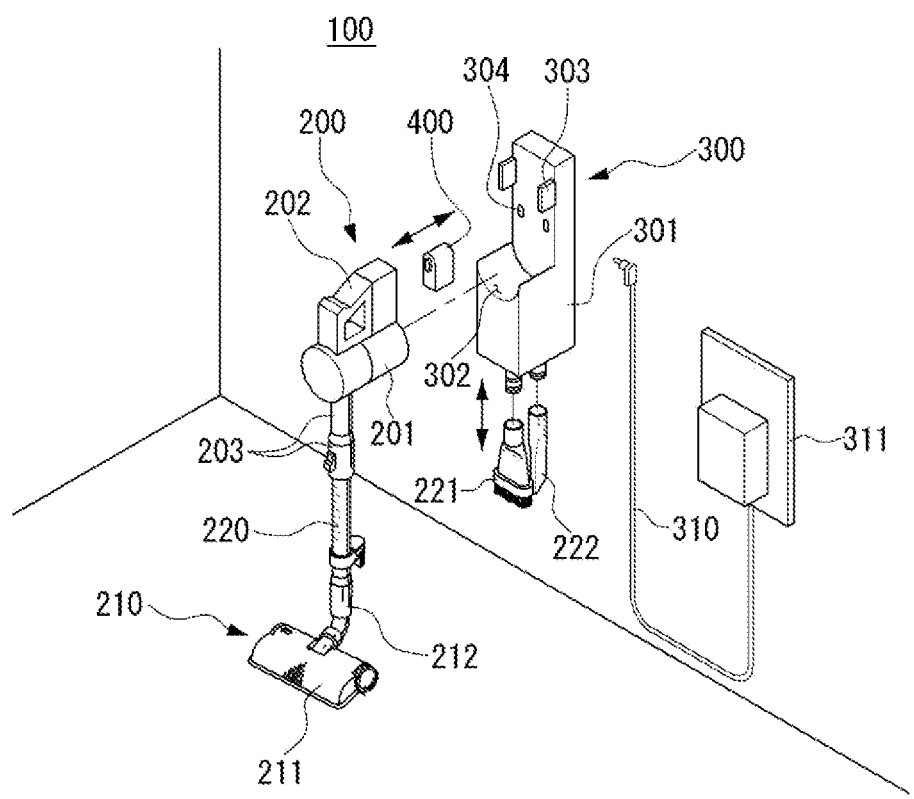
FIG. 5 is an exploded perspective view illustrating a vacuum cleaner according to an embodiment.

FIG. 5 is an exploded perspective view illustrating a vacuum cleaner 100 according to an embodiment. Referring to FIG. 5, a vacuum cleaner 100 may include a cleaner body 200, a cleaning module 210 coupled to the cleaner body 200, a length adjusting member 220 for connecting the cleaner body 200 and the cleaning module 210, a battery 400 coupled to the cleaner body 200, and a cleaner holder 300 on which the cleaner body 200 is mounted.

The cleaner body 200 may include a body part (or body housing) 201 in which a suction motor (not shown) for generating a suction force and a cyclone assembly (not shown) for separating dust from the sucked air are installed, a handle part (or handle) 202 connected to the back of the body part 201 and grabbed by the user, a connecting part (or connector) 203 connected to the front of the body part 201 and coupled to the cleaning module 210 or the length adjusting member (or extension tube) 220. The cleaning module (or suction head) 210 may include a suction part (or suction port) 211 that sucks dust and the like, and a coupling part (or coupling port) 212 coupled to the cleaner body 200 or the length adjusting member 220.

One end of the length adjusting member 220 may be coupled to the cleaner body 200, and the other end of the length adjusting member 220 may be coupled to the cleaning module 210. The length adjusting member 220 may employ a structure in which the length is variable. The length adjusting member 220 may employ a material that can be elastically changed. The one end of the length adjusting member 220 may be coupled to the cleaner body 200, and a suction part (not shown) is provided at the other end so that a suction function can be performed without coupling of a separate cleaning module.

The battery 400 may be detachably connected to the body part 201 or other component of the cleaner body 200 to supply power for driving the vacuum cleaner 100. The battery 400 may be detachably connected to a battery accommodating part (or battery accommodating housing) 302 of the cleaner holder 300 to be rechargeable. Two batteries 400 may be provided, one is coupled to the cleaner body 200 to supply power, and the other is coupled to the cleaner holder 300 to be charged.

The cleaner holder 300 may include a stand-type or wall-type body 301, a battery accommodating part 302 in which the battery 400 is charged, a cleaner support part (or cleaner support extensions) 303 which supports the cleaner body 200, a charging part (or charging contact) 304 electrically connected to the battery 400 coupled to the cleaner body 200. Although the drawing shows the wall-type body 301, it may alternatively include the stand-type body (not shown) provided in a standing state on the floor.

The battery 400 may be electrically connected to the charging part 304 while the cleaner body 200 is supported by the cleaner support part 303. Therefore, the user may charge the battery 400 while placing the cleaner body 200 on the cleaner holder 300.

The cleaner holder 300 may be electrically connected to an external outlet 311 through a power line 310. A current transmitted through the power line 310 may charge a first battery accommodated in the cleaner body 200 through the charging part 304 of the cleaner holder, and charge a second battery mounted on the battery accommodating part 302.

In addition, in the vacuum cleaner 100, the suction part performing various functions may be modularly mounted on the cleaner body 200. That is, the cleaning module 210 is provided with a plurality of functions, and the user may use the cleaning module 210 suitable for the cleaning object in combination with the cleaner body 200.

The cleaning module 210 may include a cleaning module having a basic wood floor suction port, a cleaning module having a bedding suction port, a cleaning module having a mattress suction port, a cleaning module having a carpet suction port, and a cleaning module having a mop, etc. In addition, a dedicated cleaning module for performing various functions, such as for hard dust, bending gaps, upper cleaning may be provided as a module.

The drawing shows that a cleaning module 221 having a 2in1 suction port and a cleaning module 222 having a suction hole for gaps are mounted on the cleaner holder 300. The cleaning module 221 having the 2in1 suction port may be used as a basic type when cleaning a sofa or a mattress and as a brush type when cleaning a frame or furniture by adjusting the length of the brush by button operation. In addition, the cleaning module 222 having the suction hole for gaps may have an inlet formed in a narrow nozzle shape to be advantageous for sucking dust and the like by inserting in a narrow gap.

Figure 6:
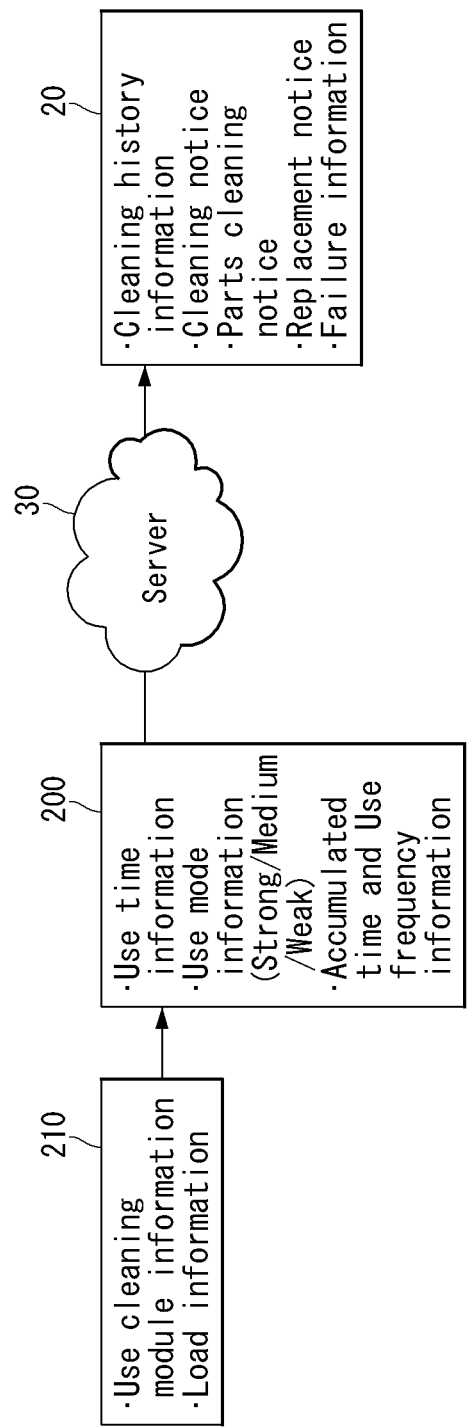
FIG. 6 is a diagram illustrating a control method of a vacuum cleaner according to an embodiment.

FIG. 6 is a diagram illustrating a control method of a vacuum cleaner 100 according to an embodiment. The vacuum cleaner 100 according to an embodiment of the present disclosure may be provided with a modular cleaning module 210 that is detachable, and may be used while changing an appropriate cleaning module 210 as necessary.

The cleaner body 200 may receive information and load information of the cleaning module used from the cleaning module 210. For example, a main circuit (MCU: Micro Controller Unit) provided in the cleaner body 200 may determine and store what is the cleaning module 210 currently being used through the current value (or voltage value) measured at the power line connected to the cleaning module 210.

Since the current value of the power line may vary depending on the load applied to the cleaning module 210, the main circuit may also store and use the load information or torque information applied to the cleaning module 210. For reference, the torque of the motor is proportional to the load current flowing through the rotor. As the load of the motor increases, the load current increases, and the torque increases to balance with the load so that stable operation can be continued. The relationship between the torque and the load current can be known through a torque characteristic curve.

In addition, the main circuit may store information regarding which cleaning module 210 was used at what time and for what time, that is, usage time information. When the usage mode may be determined into strong/medium/weak according to the rotational force of the suction motor of the cleaner body 200, the main circuit can store the usage time and usage output for each usage mode used by the user. The main circuit may transmit accumulated usage time and usage frequency information for each cleaning module used by the user to the server 30 together with the information.

The server 30 may provide cleaning history information to the user by using the accumulated information. In addition, the server 30 may inform that the cleaning time has arrived by analyzing a cleaning pattern of the user and recommending a cleaning type necessary for the smart device 20 or the vacuum cleaner 100. For example, when analyzing through the accumulated data of the vacuum cleaner 100, if the last of the bedding cleaning has been passed two months, the application of the smart device 20 may inform the user that it is time to proceed with the bedding cleaning. In addition, the server 30 may inform that the washing time of the cleaning module 210 component has arrived, or may inform that the cleaning module 210 has failed or the replacement time has elapsed.

Figure 7:
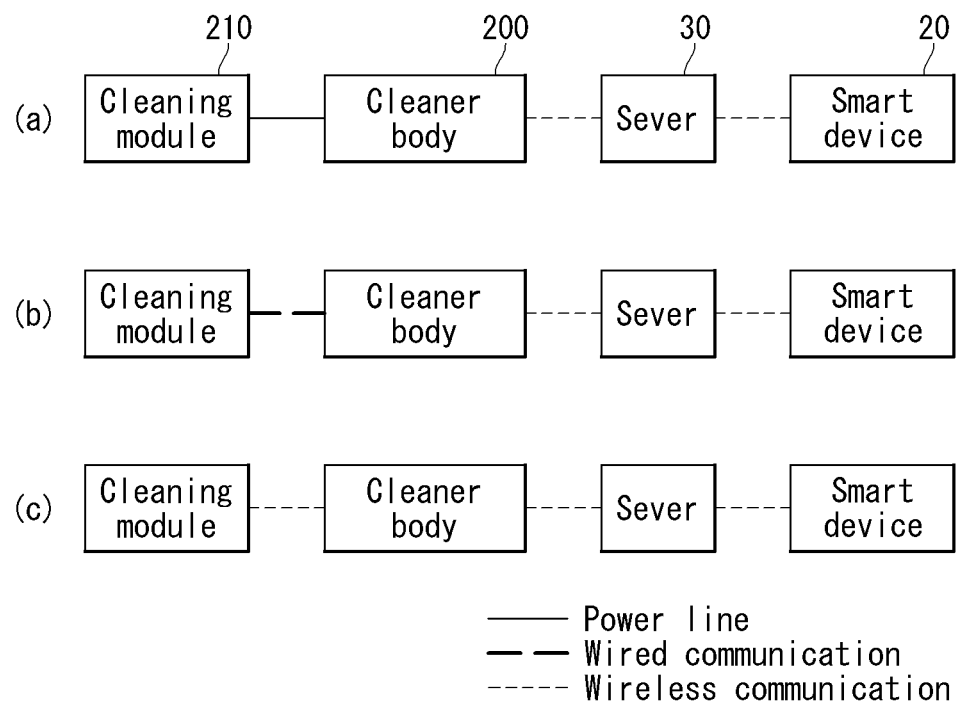
FIG. 7 is a block diagram illustrating a connection relationship of a vacuum cleaner.

FIG. 7 is a block diagram illustrating a connection relationship of a vacuum cleaner 100. Referring to FIG. 7 (region a), the cleaning module 210 and the cleaner body 200 may be physically connected through the power line, the cleaner body 200 and the server 30 may be connected by wireless communication, and the server 30 and the smart device 20 may be connected by wireless communication. A coupling part of the cleaning module 210 and the cleaner body 200 may transmit the suction force generated by the cleaner body 200 to the cleaning module 210, and may be provided with a suction pipe that is a passage for moving the dust sucked from the cleaning module 210, and a power line for providing power to the cleaning module 210. The main circuit of the cleaner body 200 can obtain information related to which cleaning module 210 is coupled, whether it is currently in use, and how much load or torque is applied through the current value (or voltage value) of the power line.

Referring to FIG. 7 (region b), the cleaning module 210 and the cleaner body 200 may be physically connected through the power line and wired communication, the cleaner body 200 and the server 30 may be connected by wireless communication, and the server 30 and the smart device 20 may be connected by wireless communication. For example, a coupling part of the cleaning module 210 and the cleaner body 200 may transmit the suction force generated by the cleaner body 200 to the cleaning module 210, and may be provided with a suction pipe that is a passage for moving the dust sucked from the cleaning module 210, a power line for providing power to the cleaning module 210, and a communication line for transmitting usage information of the cleaning module 210.

The main circuit of the cleaner body 200 can obtain information related to which cleaning module 210 is coupled, whether it is currently in use, and how much load or torque is applied through the information of the communication line. The current (or voltage) information of the power line includes noise, and when the noise is relatively large, it may not be possible to identify information to be obtained from them. In this case, by using a separate communication line, only information to be obtained can be transmitted through a separate line. For example, when a bedding cleaning module is used in combination, it may be difficult to obtain usage information through the power line because the operating current is very weak. In this case, a communication line is provided separately from the power line, it is possible to transmit information without missing information by transmitting the usage information of the cleaning module 210 through the communication line.

Figure 8:
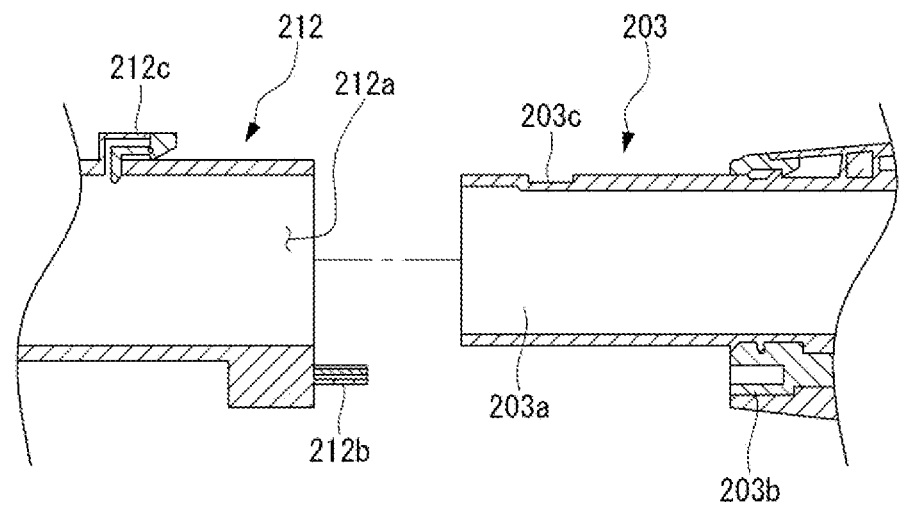
FIG. 8 is a cross-sectional view illustrating a coupling part of a cleaner body and a cleaning module according to a first embodiment.
Figure 9:
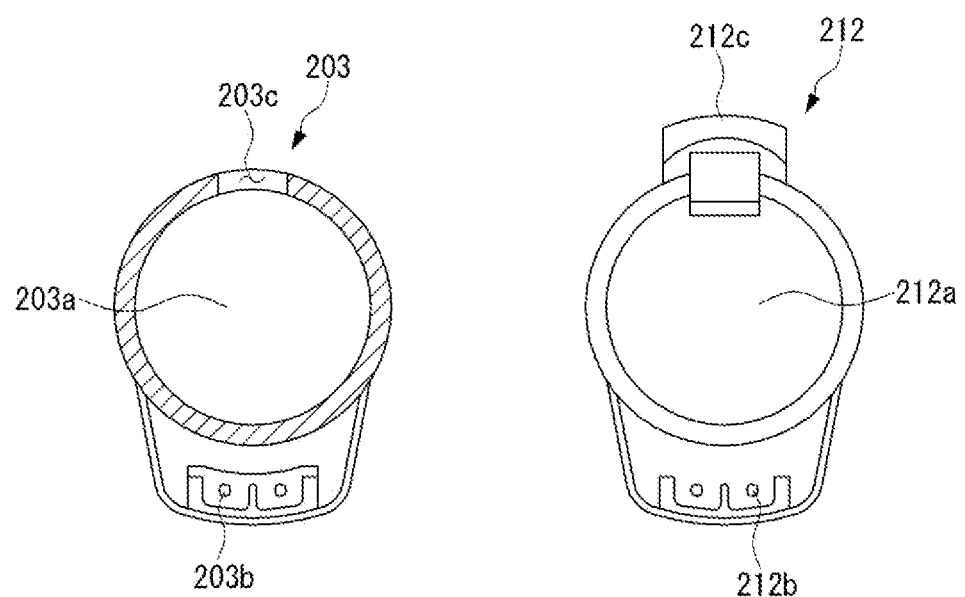
FIG. 9 is a plan view illustrating coupling parts of a cleaner body and a cleaning module according to a first embodiment, respectively.

Referring to FIG. 7 (region c), the cleaning module 210 and the cleaner body 200 may be physically connected through the power line and may be connected through wireless communication, the cleaner body 200 and the server 30 may be connected by wireless communication, and the server 30 and the smart device 20 may be connected by wireless communication. The cleaning module 210 may be provided with a transmitter for wirelessly transmitting the usage information. The cleaner body 200 may be provided with a receiver for receiving information of the cleaning module 210. In addition, the main circuit of the cleaner body 200 can obtain information related to which cleaning module 210 is coupled, whether it is currently in use, and how much load is applied through the information of the receiver. Zigbee, Bluetooth, or the like may be used as a means of wireless communication that may be used FIG. 8 is a cross-sectional view illustrating a coupling part of a cleaner body 200 and a cleaning module 210 according to a first embodiment, and FIG. 9 is a plan view illustrating coupling parts of a cleaner body 200 and a cleaning module 210 according to a first embodiment, respectively. The cleaner body 200 may form the connecting part 203 which is connected to the front of the body part 201 and is coupled to the cleaning module 210 or the length adjusting member 220. The connecting part 203 may be provided in a form of a tube protruding in front of the body part 201.

In addition, one end of the cleaning module 210 or the length adjusting member 220 may be formed with the coupling part 212 coupled to the connecting part 203. The coupling part 212 may be provided in a tubular shape in which the connecting part 203 may be accommodated. At this time, the inner diameter of the coupling part 212 may be the same or slightly larger than the outer diameter of the connecting part 203.

The connecting part 203 and the coupling part 212 may be detachably coupled. For example, the coupling may be provided by coupling of a coupling groove 203c formed to be recessed in an outer circumferential surface of the connecting part 203 and a coupling protrusion 212c formed to protrude from an inner circumferential surface of the coupling part 212.

The coupling protrusion 212c may be connected to the coupling part 212 by a hinge, and supported by an elastic member such as a coil spring. That is, when the user inserts the connecting part 203 into the inner space of the coupling part 212, the coupling protrusion 212c is pressed while pressing the elastic member, and when the insertion of the connecting part 203 is completed, the coupling protrusion 212c is fitted into the coupling groove 203c by a restoring force of the elastic member. Therefore, the connecting part 203 and the coupling part 212 can be firmly coupled.

At the time of separation, a pusher provided on the outer circumferential surface of the coupling part 212 may be used. When the user presses the pusher, the coupling protrusion 212c connected thereto is pressed in a state in which the elastic member is pressed. That is, the coupling protrusion 212c may be separated from the coupling groove 203c to separate the connecting part 203 from the coupling part 212.

The connecting part 203 may transmit the suction force generated in the cleaner body 200 to the cleaning module 210, and may be provided with a first suction pipe 203a which is a passage through which dust sucked from the cleaning module 210 moves, and a first power connection part 203b for providing power to the cleaning module 210.

In addition, the coupling part 212 may be provided with a second suction pipe 212a which is a passage through which the suction force of the connecting part 203 is transmitted and a passage through which dust sucked by the cleaning module 210 moves, and a second power connection part 212b for receiving power from the first power connection part 203b.

The first and second power connection parts 203b and 212b may be provided at one side of the first and second suction pipes 203a and 212a, and be provided in a shape in which two terminals are connected. For example, the second power connection part 212b may be provided so that the positive terminal protrudes, and the first power connection part 203b may be provided so that the negative terminal is recessed, and the second power connection part 212b may be inserted. That is, the suction pipes 203a and 212a and the power connection parts 203b and 212b may be simultaneously connected while the connecting part 203 and the coupling part 212 are coupled to each other.

Figure 10:
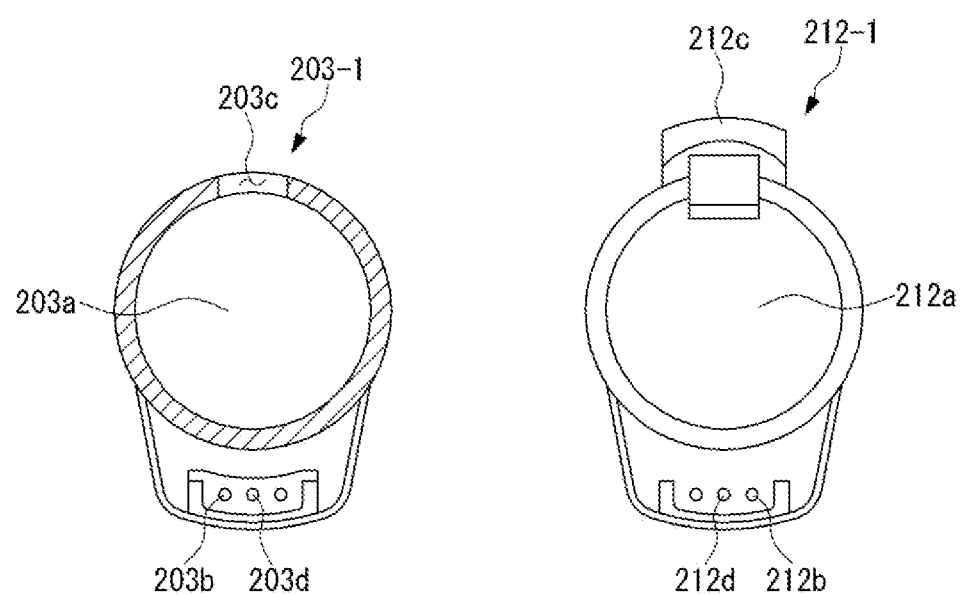
FIG. 10 is a plan view illustrating a coupling part of a cleaner body and a cleaning module according to a second embodiment, respectively.

FIG. 10 is a plan view illustrating a coupling part of a cleaner body 200 and a cleaning module 210 according to a second embodiment, respectively. The connecting part 203 may be provided with a first suction pipe 203a which is a passage through which the suction force generated in the cleaner body 200 is transmitted to the cleaning module 210, and a passage through which the dust sucked in the cleaning module 210 moves, a first power connection part 203b for providing power to the cleaning module 210, and a first information connection part 203d which is connected to a second information connection part 212d described below to receive information.

The coupling part 212 may be provided with a second suction pipe 212a which is a passage through which the suction force of the connecting part 203 is transmitted and dust sucked from the cleaning module 210 moves, a second power connection part 212b for receiving power from the first power connection part 203b, and a second information connection part 212d which transmits the information of the cleaning module 210 to the main circuit of the cleaner body 200.

The first and second power connection parts 203b and 212b may be provided at one side of the first and second suction pipes 203a and 212a, and be provided in a shape in which two terminals are connected. For example, the second power connection part 212b may be provided so that the positive terminal protrudes, and the first power connection part 203b may be provided so that the negative terminal is recessed, and the second power connection part 212b may be inserted.

In addition, the first and second information connection parts 203d and 212d may be provided adjacent to the first and second power connection parts 203b and 212b, and may be provided in a shape to which one terminal is connected. For example, the second information connection part 212d may be provided so that one terminal protrudes, and the first information connection part 203d may be provided so that the negative terminal is recessed, and the second power connection part 212d may be inserted. That is, the suction pipes 203a and 212a, the power connection parts 203b and 212b, and the information connection parts 203d and 212d may be simultaneously connected while the connecting part 203 and the coupling part 212 are coupled to each other.

The torque of the motor is proportional to the load current flowing through the rotor. When the load of the motor increases, the load current increases, and the torque increases to balance with the load so that stable operation can be continued. The relationship between the torque and the load current can be known through a torque characteristic curve.

Figure 11:
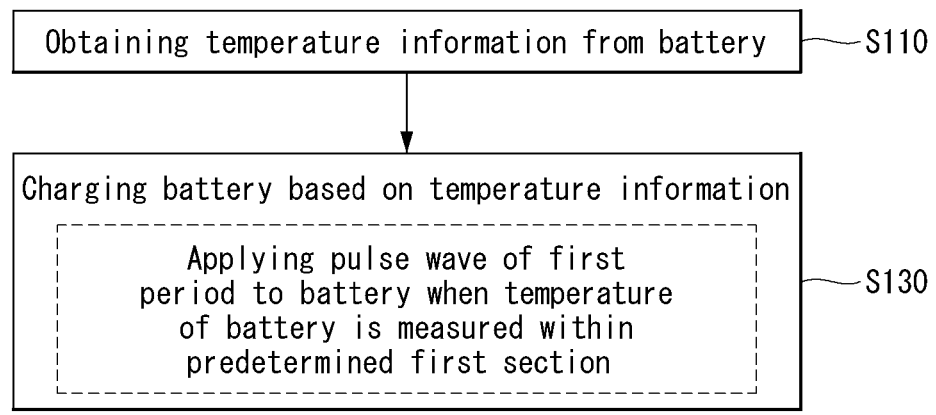
FIG. 11 is a flowchart illustrating a control method of a charger according to an embodiment of the present disclosure.

FIG. 11 is a flowchart illustrating a control method of a charger according to an embodiment of the present disclosure. As shown in FIG. 11, the charger according to the embodiment of the present disclosure may charge a battery detached/attached to a cleaner through steps S110 and S130, and the detailed description is as follows. Here, the charger may include at least a part of the cleaner holder 300 described with reference to FIG. 5. Here, the cleaner may include at least some components of the cleaner 100 described with reference to FIGS. 1 to 10.

First, the charger obtains temperature information from or of the battery attached to the cleaner (S110). Here, the temperature information may include information related to the temperature of the battery itself. Here, the temperature of the battery itself may be detected by a sensor (not shown, described later) included in the battery. When the sensor included in the battery detects the temperature of the battery itself, a processor (not shown, described later) included in the battery may transmit the temperature information to the charger through a communication unit (not shown, described later) included in the battery. Here, the communication unit may transmit the temperature information to the charger through wired communication, but is not necessarily limited thereto, and may use any form of communication medium or methodology for transmitting the temperature information.

Subsequently, the charger charges the battery attached to the cleaner based on the temperature information (S130). More specifically, the charger may determine whether the temperature of the battery is measured within a predetermined first section or range of temperature values based on the temperature information of the battery, and when the temperature of the battery is measured within the predetermined first section or range of temperature values, the charger may charge the battery by applying a pulse wave of a first period or duration to the battery. Here, the predetermined first section may mean a section or range of temperatures that is outside a predetermined charge allowable temperature range of the battery and within a predetermined discharge allowable temperature range.

Figure 12:
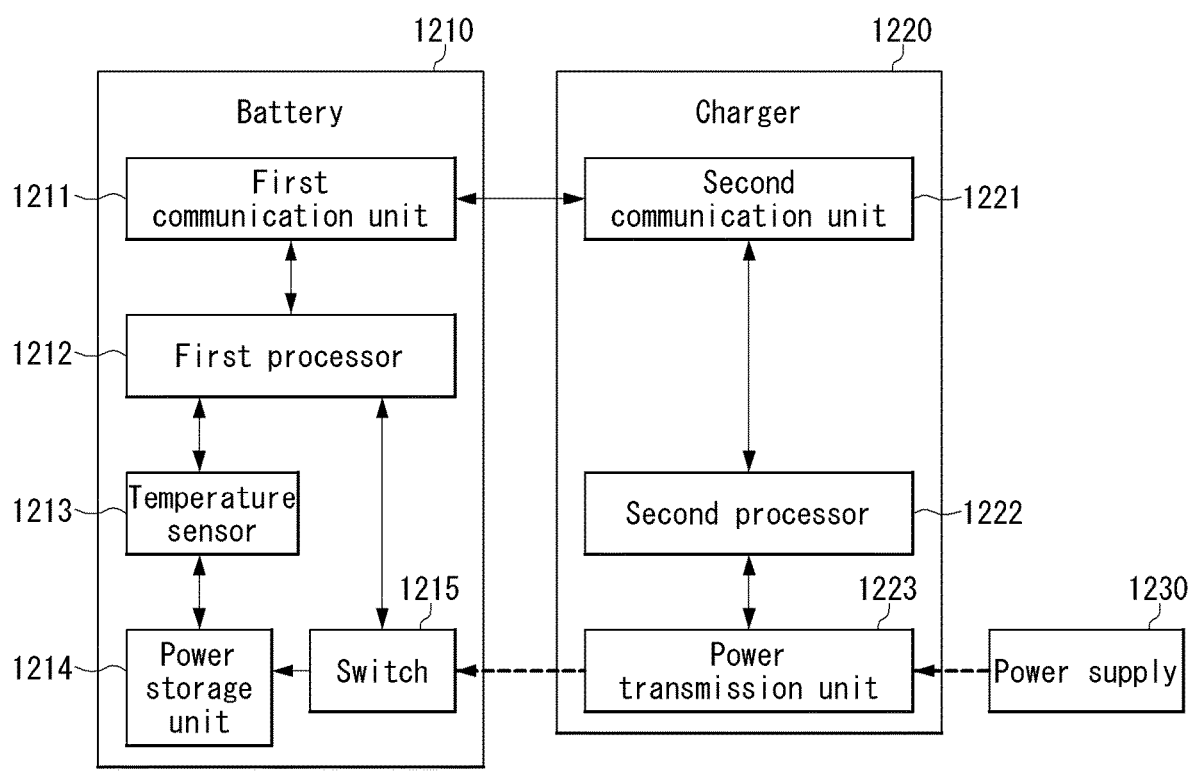
FIG. 12 is a block diagram illustrating a charger and a battery according to an embodiment of the present disclosure.

FIG. 12 is a block diagram illustrating a charger and a battery according to an embodiment of the present disclosure. As shown in FIG. 12, a battery 1210 may include a first communication unit 1211, a first processor 1212, a temperature sensor 1213, a power storage unit 1214, and/or a switch 1215. A charger 1220 may include a second communication unit 1221, a second processor 1222, and/or a power transmission unit 1223. The charger 1220 may receive power from a power supply 1230 to charge the battery 1210 (dotted line direction). Detailed description is as follows.

First, the temperature sensor of the battery may detect a temperature that changes as the power storage unit is discharged/charged. The temperature sensor may transmit the detected temperature to the first processor. The first processor may transmit information related to the temperature transmitted from the temperature sensor to the first communication unit. The first communication unit may transmit the transmitted temperature information to the second communication unit through second wired/wireless communication of the charger. The switch may transmit power applied from the charger to the power storage unit or shut off the power applied from the charger under the control of the first processor. For example, when the temperature detected by the temperature sensor is outside the discharge allowable temperature range, the first processor may prevent the power from being applied to the power storage unit by shutting off the switch.

Subsequently, the second communication unit of the charger may obtain the temperature information of the power storage unit from the first communication unit of the battery. The second communication unit may transmit the obtained temperature information to the second processor.

When the temperature of the battery (or the power storage unit) is outside the discharge allowable temperature range, the second processor may shut off the power applied to the battery. When the temperature of the battery is within the charge allowable temperature range, the second processor may apply a constant voltage or a constant current to the battery. When the temperature of the battery is outside the charge allowable temperature range and within the discharge allowable temperature range, the second processor may charge the battery by applying a pulse wave of a predetermined period of 1 second or less to the battery. The power transmission unit of the charger may transmit power supplied from the power supply (e.g. a power outlet) to the battery under the control of the second processor.

Figure 13:
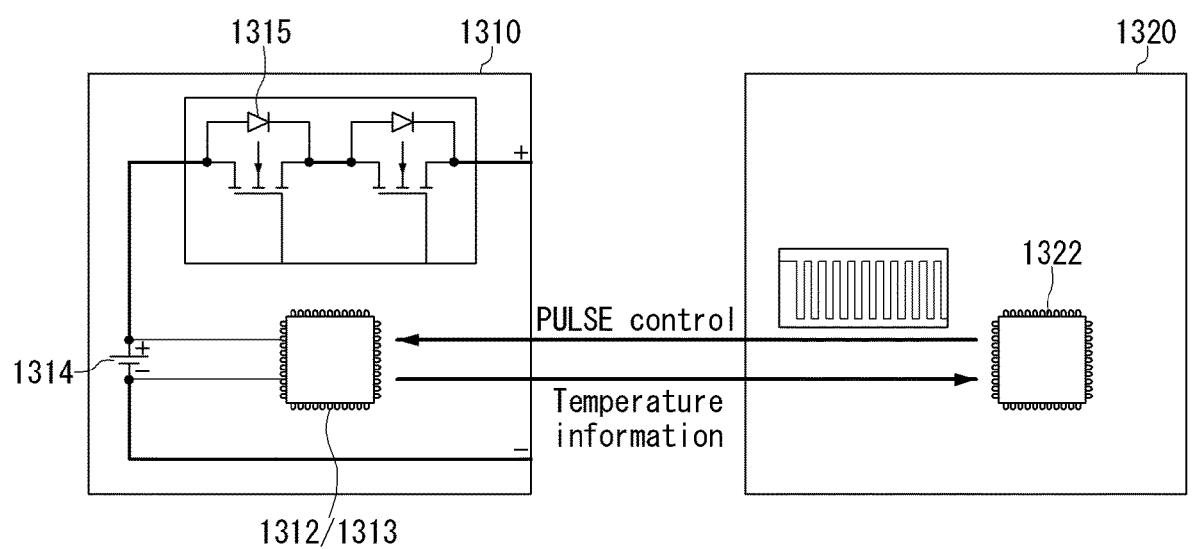
FIG. 13 is a diagram illustrating a battery and a charger of FIG. 12 in terms of signal processing.

FIG. 13 is a diagram illustrating the battery and the charger of FIG. 12 in terms of signal processing. As shown in FIG. 13, a battery 1310 may include at least one switch 1315, a power storage unit 1314, and a processor 1312/1313. Here, the processor may detect a temperature of the power storage unit and transmit temperature information to a charger 1320.

A processor 1322 of the charger 1320 may generate/control a pulse waveform based on the temperature information transmitted from the battery, and transmit the generated pulse waveform to the battery. When the pulse waveform is transmitted to the battery 1310, power is stored in the power storage unit 1314.

Figure 14:
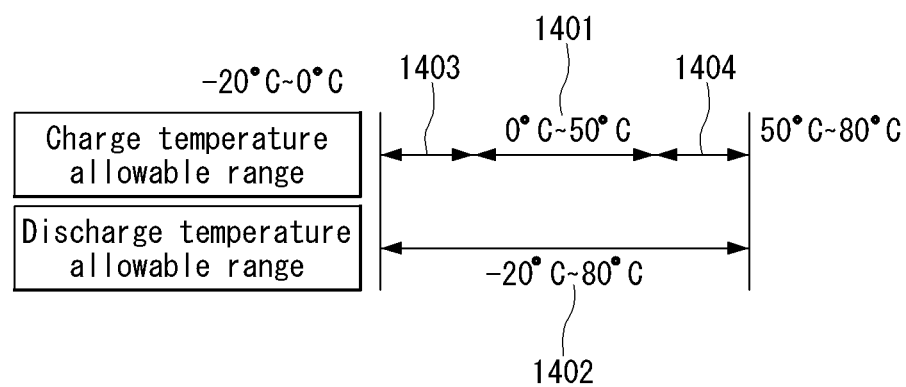
FIG. 14 illustrates a temperature distribution according to an embodiment of the present disclosure.

FIG. 14 illustrates a temperature distribution according to an embodiment of the present disclosure. As shown in FIG. 14, a charge allowable temperature range may mean a range between a charge allowable minimum temperature and a charge allowable maximum temperature. That is, the charge allowable temperature range may be determined by an allowable operating temperature parameter (e.g. a Minimum/Maximum Operating Temperature Parameter) and/or an allowable surface temperature parameter (e.g. a Minimum/Maximum Surface Temperature Parameter). Here, the allowable operating temperature parameter and/or the allowable surface temperature parameter may be set in advance by the user/manufacturer as described above. For example, an allowable operating temperature lower limit or an allowable surface temperature lower limit may be preset at 0 degrees Celsius, and an allowable operating temperature upper limit or an allowable surface temperature upper limit may be preset at 50 degrees Celsius. That is, a range 1401 between 0 degrees Celsius and 50 degrees Celsius may be defined as the charge allowable temperature range.

The charge allowable temperature range may mean a temperature range in which a probability that an exothermic reaction of a predetermined amount or more occurs in a battery is greater than or equal to a threshold value as the battery is charged. For example, the charge allowable temperature range may mean a section or range between 0 degrees Celsius and 50 degrees Celsius. Here, the charge allowable temperature range may be preset in advance by the user or may be specified in advance by the manufacturer.

The discharge allowable temperature range may mean a range between a discharge temperature lower limit and a discharge temperature upper limit. For example, a discharge allowable temperature lower limit value may be set in advance to −20 degrees Celsius, and a discharge allowable temperature upper limit value may be set in advance to 80 degrees Celsius. That is, a range 1402 between −20 degrees Celsius and 80 degrees Celsius may be defined as the discharge allowable temperature range.

The discharge allowable temperature range may mean a temperature range in which a probability that an exothermic reaction of a predetermined amount or more occurs in a battery is greater than or equal to a threshold value as the battery is discharged. For example, the discharge allowable temperature range may mean a section between −20 degrees Celsius and 80 degrees Celsius. Here, the discharge allowable temperature range may be preset in advance by the user or may be specified in advance by the manufacturer.

More specifically, the charger may not charge the battery outside the discharge allowable temperature range. The charger may charge the battery within the charge allowable temperature range and charge the battery by applying a constant voltage or a constant current to the battery.

According to an embodiment of the present disclosure, the charger may charge the battery in the predetermined first section (e.g., within the discharge allowable temperature range and outside the charge allowable temperature range), but may charge the battery by applying a pulse wave of a predetermined period without applying a constant voltage or a constant current. This is because, when the battery is charged by applying the constant voltage or the constant current in the first section, the probability that the exothermic reaction occurs in the battery in which the temperature of the first section is detected is greater than or equal to the threshold. That is, when the pulse wave of the predetermined period is applied in the first section instead of the constant voltage or the constant, the voltage of the battery can be charged while the probability that the exothermic reaction occurs in the battery is equal to or less than the threshold value.

Here, the period of the pulse wave applied from the charger to the battery may be 1 second or less. This is because applying a pulse wave of a period greater than 1 second to the battery has the same effect (e.g. the exothermic reaction) as applying the constant voltage or the constant current to the battery. For this reason, the charger may charge the battery in which the temperature of the first section is detected by using the pulse wave of the period of 1 second or less. Here, a total of a section 1403 between −20 degrees Celsius and 0 degrees Celsius and a section 1404 between 50 degrees Celsius and 80 degrees Celsius may be defined as the predetermined first section referred to in FIG. 11.

Figure 15:
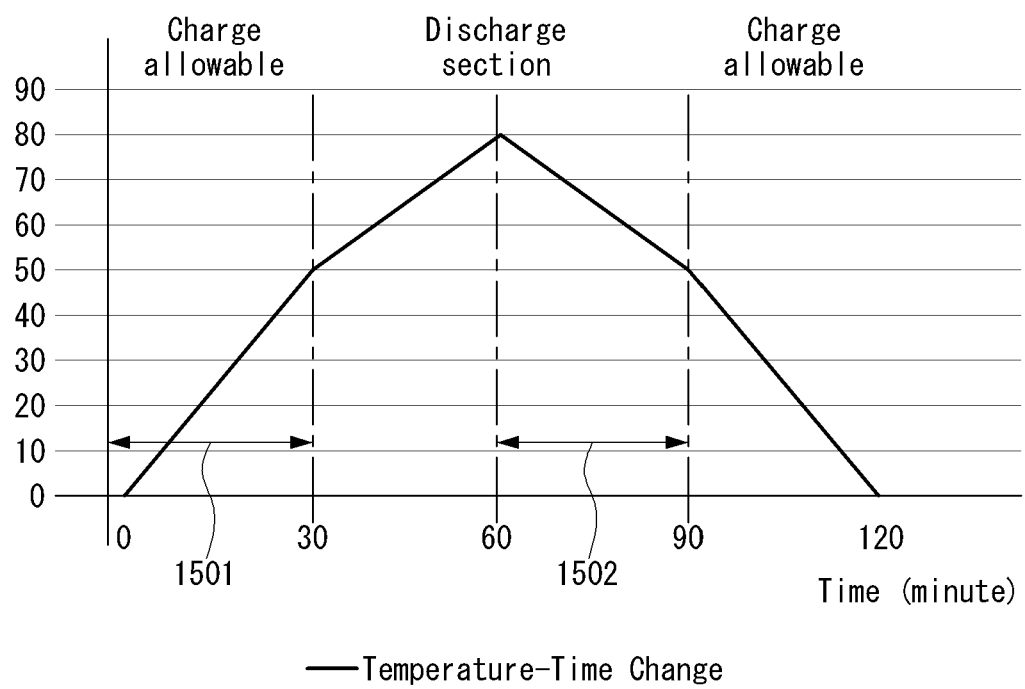
FIG. 15 is a graph illustrating a change in temperature with a change in time.

FIG. 15 is a graph illustrating a change in temperature with a change in time. As shown in FIG. 15, for example, when the temperature of the battery is 0 degrees Celsius when t=0 (minute), when the battery is discharged as the cleaner operates, the temperature of the battery increases in proportion to time as time passes. In this case, a section between 0 degrees Celsius and 50 degrees Celsius may be preset to a charge allowable temperature range.

For example, as the cleaner operates, the temperature of the battery may be 80 degrees Celsius when t=60 (minutes). According to the prior art, even if the user wants to charge the battery of the cleaner, as the temperature of the battery exceeds 50 degrees Celsius in the section between t=60 (minutes) and t=90 (minutes), because it is outside the charging allowable temperature range, the battery cannot be charged. Therefore, when the user wants to charge the battery of the cleaner, there is an inconvenience to wait from t=60 (minutes) to t=90 (minutes).

However, according to an embodiment of the present disclosure, when connecting a cleaner with a battery to a charger at t=60 (minutes), the charger may charge the battery by applying a pulse wave to the battery in the section between t=60 (minutes) and t=90 (minutes) (a section within the discharge allowable temperature range and outside the charge allowable temperature range).

When time elapses and t=90 (minutes) and the temperature of the battery drops below 50 degrees Celsius, the temperature of the battery will be within the charge allowable temperature range, in this case, the charger may charge the battery by applying a constant voltage or a constant current to the battery.

Figure 16:
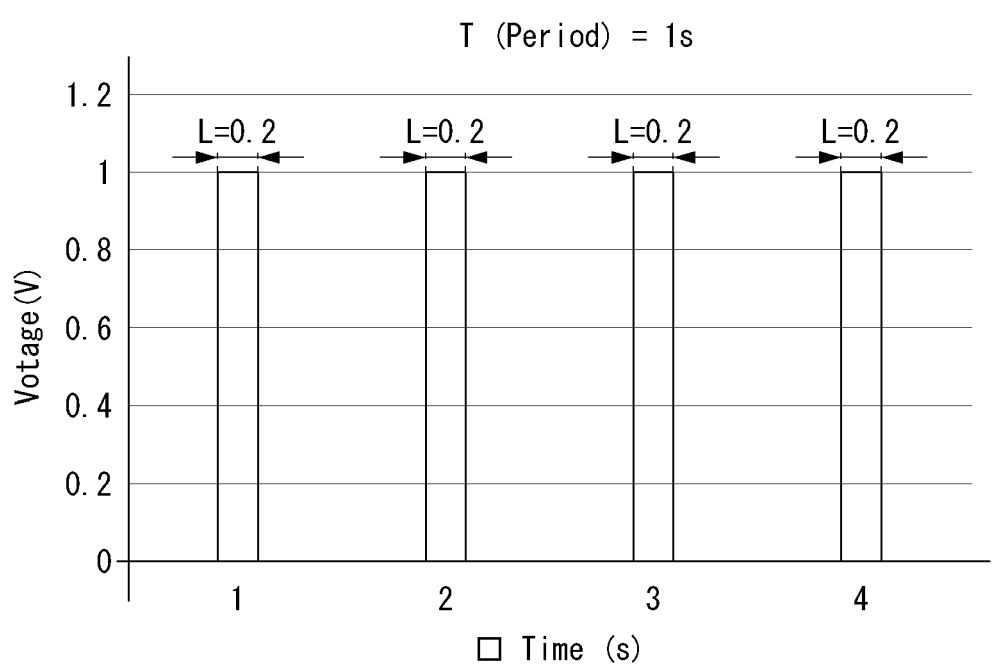
FIG. 16 illustrates one example of a pulse wave according to an embodiment of the present disclosure.

FIG. 16 illustrates one example of a pulse wave according to an embodiment of the present disclosure. As shown in FIG. 16, the charger may apply a pulse wave of T (period)=1 s to the battery. For example, a peak of the pulse wave may be 1V. For example, a duration L of the pulse wave may be 0.2 (s).

Figure 17:
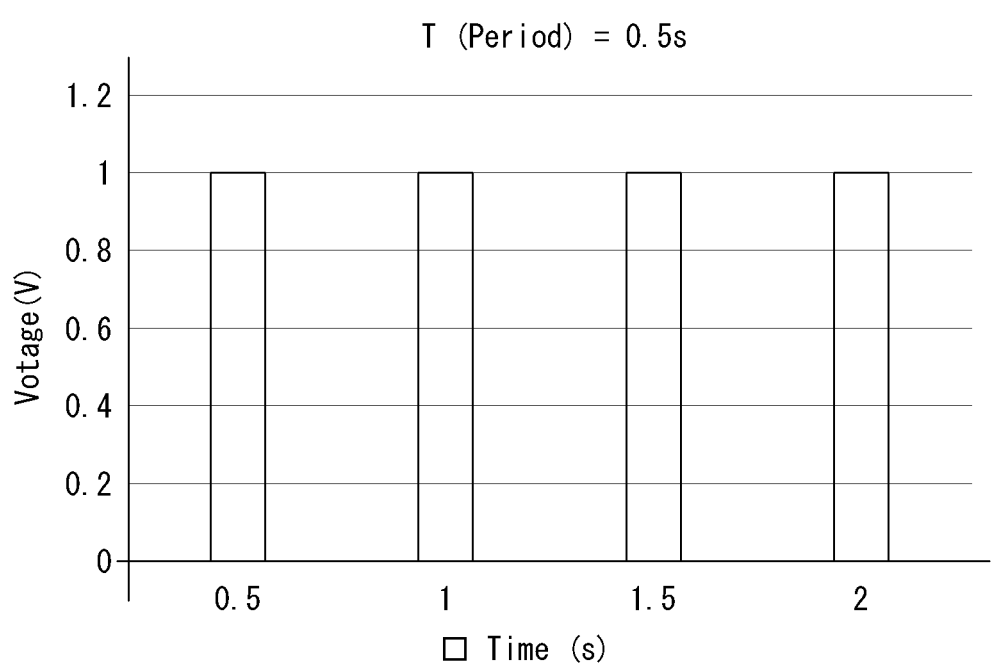
FIG. 17 illustrates another example of a pulse wave according to an embodiment of the present disclosure.

FIG. 17 illustrates another example of a pulse wave according to an embodiment of the present disclosure. As shown in FIG. 17, the charger may apply a pulse wave of T (period)=0.5 s to the battery.

Figure 18:
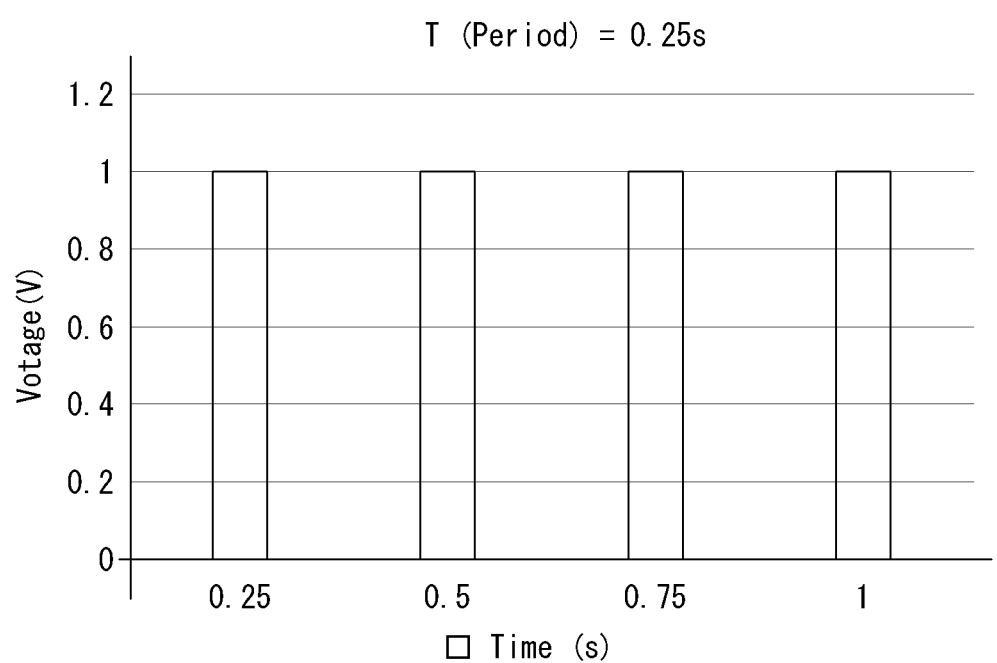
FIG. 18 illustrates another example of a pulse wave according to an embodiment of the present disclosure.

FIG. 18 illustrates another example of a pulse wave according to an embodiment of the present disclosure. As shown in FIG. 18, the charger may apply a pulse wave of T (period)=0.25 s to the battery.

Figure 19:
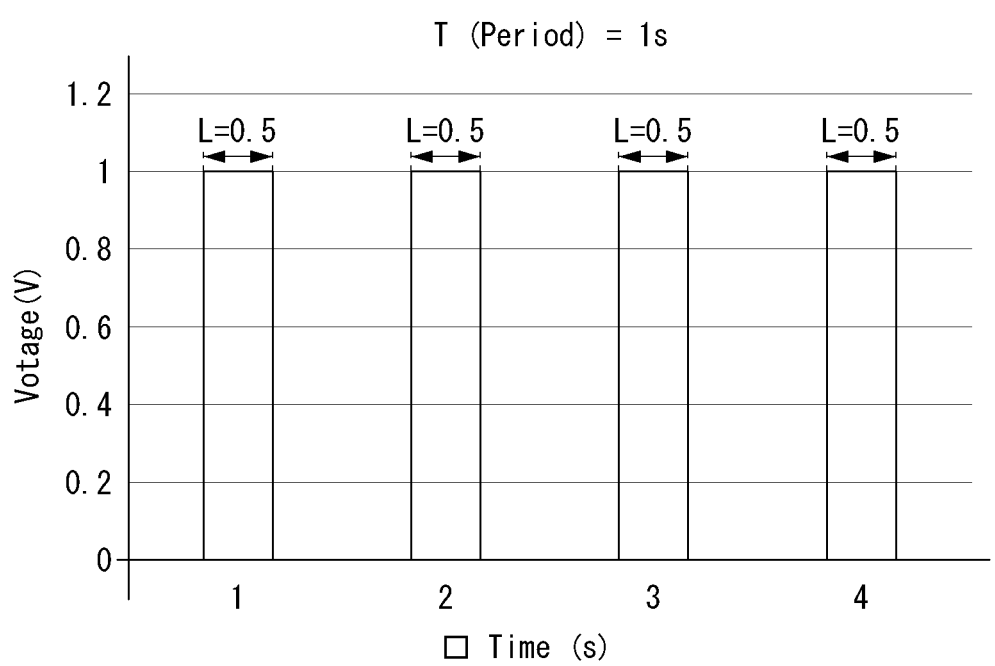
FIG. 19 illustrates another example of a pulse wave according to an embodiment of the present disclosure.

FIG. 19 illustrates another example of a pulse wave according to an embodiment of the present disclosure. As shown in FIG. 19, the charger may apply a pulse wave of a duration L of 0.5 (s) and T (period)=1 s to the battery.

Figure 20:
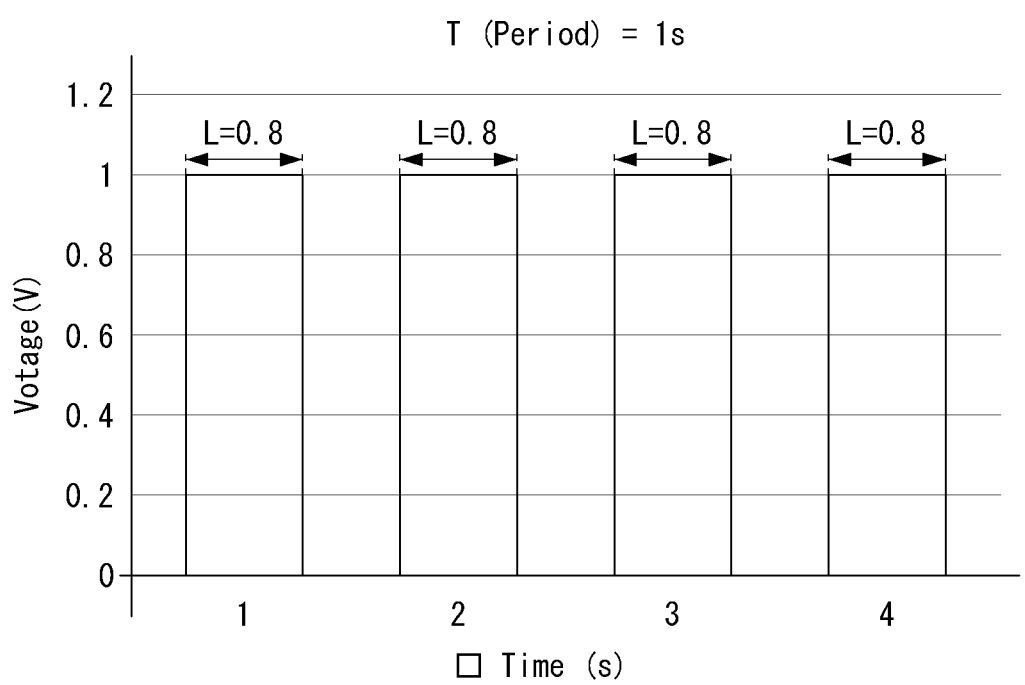
FIG. 20 illustrates the other example of a pulse wave according to an embodiment of the present disclosure.

FIG. 20 illustrates the other example of a pulse wave according to an embodiment of the present disclosure. As shown in FIG. 20, the charger may apply a pulse wave of a duration L of 0.8 (s) and T (period)=1 s to the battery.

Although various types of pulse waves have been described with reference to FIGS. 16 to 20, they are not necessarily limited thereto. For example, the second processor of the charger may determine the duty ratio of the pulse wave based on the temperature information of the battery. For example, the second processor of the charger may change the duration of the pulse wave and/or a rest period between pulse waves in real time depending on the temperature of the battery. For example, the duration and/or rest period of the pulse wave may be adjusted based on a difference between a temperature of the battery and a charge temperature allowable range, such as to increase the duration, reduce the rest period, and/or increase a voltage/current applied to the battery during the pulse when the temperature of the battery drops to be closer to the charge temperature allowable range. In another example, the duty ratio of the pulse wave may be decreased if the temperature of the battery increases in response to the pulse wave.

Some embodiments or other embodiments of the present disclosure described above are not mutually exclusive or distinct from one another. Some embodiments or other embodiments of the present disclosure described above may be used in combination with or combined with each configuration or function. For example, it means that configuration A described in specific embodiments and/or drawings and configuration B described in other embodiments and/or drawings may be combined. In other words, even when the combination between the configurations is not described directly, it means that the combination is possible except when it is described that the combination is impossible.

The above detailed description should not be construed as limiting in all respects but should be considered as illustrative. The scope of the present disclosure should be determined by reasonable interpretation of the appended claims, and all changes within the equivalent scope of the present disclosure are included in the scope of the present disclosure.

An aspects of the present disclosure provides a control method of a charger capable of charging a battery of a cleaner more quickly and safely. In addition, the present disclosure provides a charger that can efficiently charge the battery even at a temperature outside the charge allowable range of the battery of the cleaner.

A control method of a charger according to an embodiment of the present disclosure includes obtaining temperature information of a battery from the battery when connected to the battery of a cleaner; and charging the battery based on the temperature information, wherein the charging the battery is applying a pulse wave of a first period to the battery when the temperature of the battery is measured within a predetermined first section.

In addition, the first section may be determined based on predetermined maximum charge allowable temperature information and predetermined minimum charge allowable temperature information. In addition, the first period may be 1 second or less. In addition, the method may further include changing the first period based on the temperature information. In addition, the method may further include changing duration of the pulse wave based on the temperature information.

A charger according to an embodiment of the present disclosure includes a communication unit configured to obtain temperature information of the battery from an external battery; and a processor configured to apply power to the battery based on the temperature information transmitted from the communication unit, wherein the processor is configured to apply a pulse wave of a first period to the battery when the temperature of the battery is measured within a predetermined first section.

In addition, the processor may determine the first section based on predetermined maximum charge allowable temperature information and predetermined minimum charge allowable temperature information. In addition, the processor may determine the first period as 1 second or less. In addition, the processor may change the first period based on the temperature information. In addition, the processor may change duration of the pulse wave based on the temperature information. Even if the battery temperature is outside the charge allowance range due to the discharge of the battery built in the cleaner, the cleaner and control method thereof according to the present disclosure may shorten the total time required for charging the battery by charging the battery more quickly.

In addition, according to at least one of the embodiments of the present disclosure, it is possible to safely charge the battery even in a dangerous state in which the temperature of the battery of the cleaner is outside the charge allowance range, so that the present disclosure can prevent the risk that may occur when charging the battery.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for charging a battery, comprising:
    determining a temperature of the battery when a charger is connected to the battery; and
    charging the battery based on the temperature of the battery,
    wherein charging the battery includes:
        applying a series of modulated pulses of a prescribed pulse width and a prescribed pulse repetition interval to the battery when the temperature of the battery is greater than an upper limit of a charge allowable temperature range for the battery and equal to or less than an upper limit of a discharge allowable temperature range for the battery; and
        applying at least one of a constant current or a constant voltage to the battery when the temperature of the battery is within the charge allowable temperature range,
    wherein the charge allowable temperature is a temperature range in which a probability that an exothermic reaction of a predetermined amount or more occurs in a battery is greater than or equal to a first threshold value as the battery charged,
    wherein the discharge allowable temperature is a temperature range in which a probability that the exothermic reaction of a predetermined amount or more occurs in a battery is greater than or equal to a second threshold value as a battery is discharged.

2. The method of claim 1, wherein the pulse repetition interval is 1 second or less.

3. The method of claim 1, further comprising:
    changing the pulse repetition interval based on a change in the temperature of the battery.

4. The method of claim 1, further comprising:
    changing the pulse width based on a change in the temperature of the battery.

5. The method of claim 1, further comprising:
    changing at least one of a current or a voltage of the modulated pulses based on a change in the temperature of the battery.

6. The method of claim 1, wherein determining the temperature of the battery includes obtaining the temperature of the battery from a sensor in the battery.

7. The method of claim 1, wherein the battery is included in a cleaner, and charging the battery is performed when the cleaner is electrically coupled to the charger.

8. A charger, comprising:
    a contact configured to be electrically connected to a battery; and
    a processor configured to:
        determine a temperature of the battery, and
        control power applied to the battery via the contact based on the temperature of the battery,
        wherein the processor causes modulated pulses of a prescribed pulse width and a prescribed pulse repetition interval to be applied to the battery when the temperature of the battery is greater than an upper limit of a charge allowable temperature range for the battery and equal to or less than an upper limit of a discharge allowable temperature range for the battery, and causes at least one of a constant current or a constant voltage to the battery when the temperature of the battery is within the charge allowable temperature range,
        wherein the charge allowable temperature is a temperature range in which a probability that an exothermic reaction of a predetermined amount or more occurs in a battery is greater than or equal to a first threshold value as the battery is charged,
        wherein the discharge allowable temperature is a temperature range in which a probability that the exothermic reaction of a predetermined amount or more occurs in a battery is greater to a second threshold value as the battery is discharged.

9. The charger of claim 8, further comprising:
    a transceiver configured to obtain, from the battery, sensor information of the battery, wherein the processor determines the temperature of the battery based on the sensor information.

10. The charger of claim 8, wherein the pulse repetition interval is 1 second or less.

11. The charger of claim 8, wherein the processor is further configured to change the pulse repetition interval based on a change in the temperature of the battery.

12. The charger of claim 8 wherein the processor is further configured to change the pulse width based on a change in the temperature of the battery.

13. The charger of claim 8, wherein the processor is further configured to change at least one of a current or a voltage of the pulses based on a change in the temperature of the battery.

14. The charger of claim 8, wherein the battery includes at least one switch electrically connected to the contact, and the processor, when controlling power applied to the battery via the contact, is further to provide a control signal that causes the at least one switch to be selectively activated to form the modulated pulses from power applied via the contact.

* * * * *